Oct. 4, 1932.     H. R. HAYDEN     1,881,357

ELECTRICAL SIGNALING SYSTEM

Filed Aug. 15, 1928

INVENTOR.
Harold R. Hayden
BY Sheldon H. Graves.
his ATTORNEY.

Patented Oct. 4, 1932

1,881,357

UNITED STATES PATENT OFFICE

HAROLD R. HAYDEN, OF BROOKLYN, NEW YORK

ELECTRICAL SIGNALING SYSTEM

Application filed August 15, 1928. Serial No. 299,680.

This invention relates to electrical signal receiving systems employing three-electrode vacuum tubes as detectors and amplifiers, and also to certain apparatus adapted for the use as parts of such system.

In the preferred embodiment of my invention herein disclosed, the system is a multi-stage signal receiving system employing a detector stage followed by several stages of audio-frequency amplification, and each of the audio-frequency stages is coupled to the preceding stage by a so-called resistance coupling: the last audio-frequency stage serving to operate a loud speaker or other signal-translating device. Each stage of the system includes a three-electrode vacuum tube, the filament of which is heated by direct current from any suitable source such as a battery, and, if desired, means may be provided for maintaining the battery charged from a source of alternating current, such as the usual alternating current lighting mains, and the plate circuits of the several tubes are energized from the same source of alternating current through a rectifier and filter.

The antenna circuit, which is preferably untuned, includes the primary winding of a radio-frequency transformer, the secondary of which is in the grid circuit of the detector tube, and the plate circuit of the detector tube includes a third winding, positioned in inductive relation to the secondary or grid circuit winding: the last winding being adjustable to vary the coupling between the grid and plate circuit. The primary, or antenna winding, and the secondary, or grid winding, serve as a means for transferring signal energy from the antenna circuit to the grid circuit, and the third or plate circuit winding serves to transfer energy from the plate circuit back to the grid circuit to increase the amplification of the signals. Connected across the terminals of the grid circuit winding is a condenser which is adjustable to tune the grid circuit to the frequency of any desired incoming signals. One side of this condenser is connected in the usual manner with the filament supply circuit, and the other side of the condenser is connected to the grid of the detector tube through an adjustable condenser of small capacity, and shunting the condenser is a high resistance which is also adjustable.

The particular construction and arrangement of the detector tube grid and plate circuits and associated antenna circuit, form an important feature of the present invention. These circuits are designed to secure a maximum efficiency of operation, including a high degree of selectivity in tuning for the reception of signal carrier waves of different frequencies, and a maximum amplification of the received signals. The antenna, grid circuit and plate circuit windings are designed as an electrically balanced unitary structure, and these windings are so proportioned and arranged relative to one another as to secure a maximum transfer of energy from the antenna circuit to the grid circuit, with minimum resistance and dielectric losses, and these windings, co-operating with the remainder of the plate and grid circuits, permit a large amount of energy to be transferred from the plate to the grid circuit so as to produce high amplification without producing any of the disturbing regenerative effects common to systems of this character.

Important among the means which I employ for controlling the regeneration and avoiding the production of squeals and other disturbing noises in the loud speaker, are the small capacity condenser and bridging resistance above referred to. This resistance and condenser have the function common to the usual grid leak condensers and resistances, namely, of supplying a biasing potential to the grid of the detector tube and providing a path of low impedance around the biasing resistance for the high frequency components of the grid circuit current. As previously stated, in my system both the grid leak condenser and grid leak resistance are adjustable. I find that by a proper selection of the range of values over which the grid leak resistance and condenser may be adjusted, that these adjustments of the resistance and condenser will control the amount of regeneration in the detector stage, and that by proper adjustment of these elements, the disturbing regenerative effects such as are caused by the oscillation of the detector tube may be prevented. Ordinarily, in the normal use of the system, the adjusting of the grid leak condenser and resistance is not necessary. These elements, when once adjusted, need not be disturbed: the usual operations of tuning for the reception of signal waves of different frequencies being performed by adjusting the tuning condenser connected across the grid circuit winding, and the control of amplification being effected by adjustment of the plate circuit winding relative to the grid circuit winding. When, however, other changes are made in the system, as occasionally will be required, as, for example, when a new vacuum tube is substituted for one which has become exhausted, I find that a readjustment of the grid leak condenser and resistance is very desirable in order to maintain the same high order of amplification throughout adjustments of the tuning condenser to receive signal carrier waves over a wide range of frequencies, and, in order, at the same time, to avoid the occurence of disturbing regenerative effects. This I find to be true even though the substituted tube is of the same type as the old one, and is sold as a tube identically the same as the old one. The adjustment of the grid leak condenser and resistance does not require a new adjustment of the tuning condenser for receiving a signal carrier wave of any one frequency. Indications of the various sending stations may be marked on the tuning condenser's dial, and these indications will serve equally well for a new adjustment of the grid leak condenser and resistance.

The adjustable grid leak condenser and resistance in my improved system also has another important function. As previously stated, the several plate circuits of the system are energized from a source of alternating current through a rectifier and filter. The rectifier delivers to the filter, half-wave current impulses which are smoothed out to a considerable extent by the filter, the filter delivering to the plate circuits a direct current, which, however, is subject to slight variations of low frequency. These variations in current, or in the potential applied to the plate circuits, tend to cause a disturbing noise, or hum, in the loud speaker. This effect is more pronounced in systems employing a plurality of stages coupled to one another by audio-frequency couplings, as in the case in a multi-stage audio-frequency amplifier, because the low frequency hum variation in the plate circuits of the first stages are readily carried over through the audio-frequency couplings to the grid circuits of the succeeding stages, and are amplified in the succeeding stages, so that the plate circuit of the last stage carried these hum variations in greatly amplified form.

In systems constructed in accordance with my invention, which are designed to eliminate hum, I make use of an inter-stage coupling so constructed and arranged that variations in an earlier stage are reversed in phase and the reversed variations are caused to oppose, in their effect, the effect of filter voltage variations applied to the plate circuit of a later stage, and I provide an improved means for controlling the relative values of these opposing effects so that current variations in the last stage are reduced to any extent desired, as will be more fully explained hereafter.

While other types of inter-stage couplings may be employed, in the embodiment of my invention, herein illustrated, I employ a resistance coupling. Experience has also shown that where resistance couplings are employed between successive stages of audio-frequency amplification, the use of sources of unsteady potential for the plate circuits has a greater tendency to produce hum than where other forms of couplings are employed. In my improved system, wherein the plate circuits are energized from the source of unsteady potential, I am able to employ resistance couplings between the audio-frequency stages without producing any appreciable hum in the loud speaker. One means for effecting this result is the adjustable grid leak condenser and resistance. Adjustments of these elements serve to change the amount of hum produced, and at certain adjustments the hum is entirely eliminated. The grid leak condenser and resistance at these particular adjustments also serve to give to the detector tube the requisite grid bias for proper detecting action and properly to control the regeneration so as to permit high amplification.

The plate voltages employed by me, for all of the tubes, except the final amplifier tube, are relatively low, and the grid biasing voltages of all of the tubes are correspondingly low. The low plate voltage, with resultant low plate current, results in economy of power consumption, also assisting in the elimination of hum due to the variations in plate voltage. I find that I am able to employ these low voltages and currents in the four-tube multi-stage receiving system disclosed, and at the same time secure ample volume of sound from the loud speaker.

A further advantage of my invention is to provide a system of the character described wherein the desired amplification is effected at minimum distortion of the signals received.

The particular construction and arrangement of the parts of my improved system, as well as advantages other than those above noted, will appear from the following description taken in connection with the accompanying drawing wherein The figure is a circuit diagram of a signal receiving system showing one form of my invention.

Figure 1:
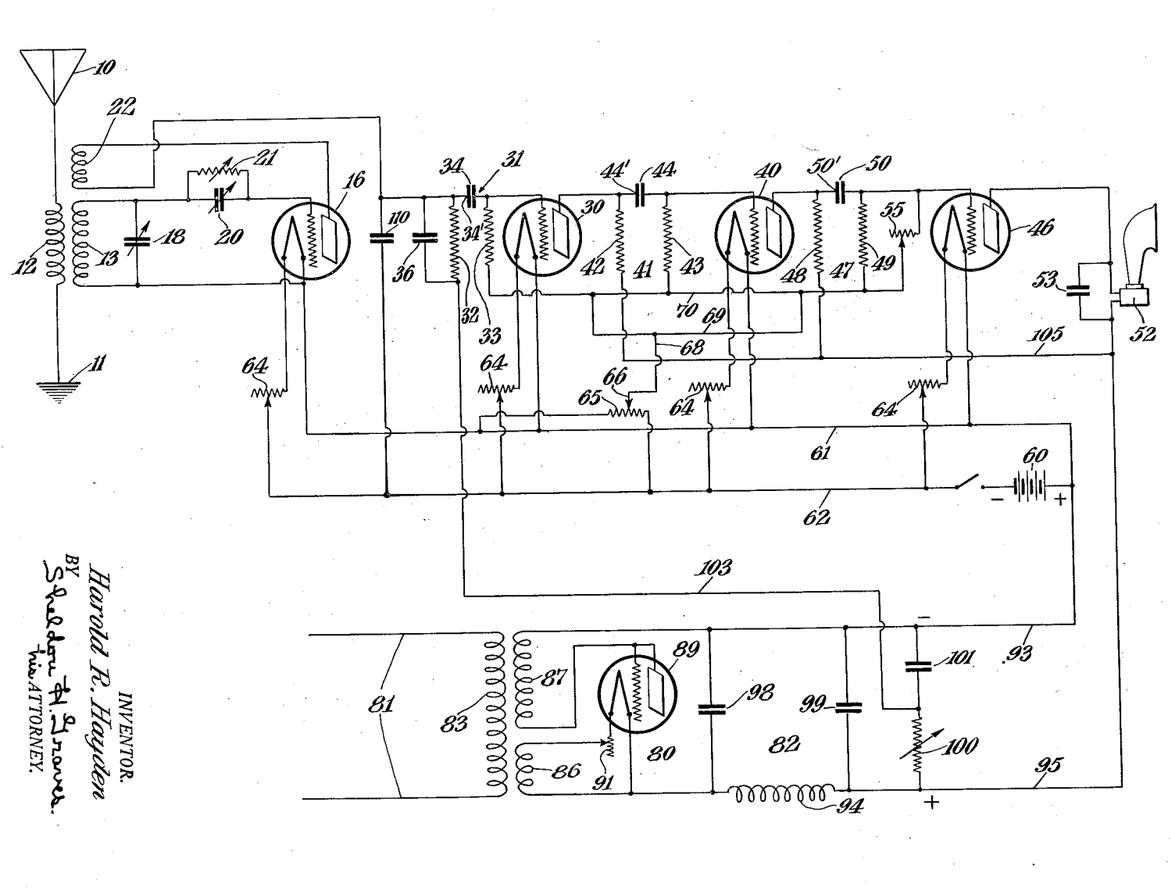

Referring to the figure of the drawing, 10 represents an antenna adapted to receive signal waves. The antenna is grounded at 11 through a winding 12 positioned in inductive relation to a winding 13, included in the grid circuit of the detector tube 16. Connected across the terminals of winding 13 is a condenser 18 which is adjustable to tune the grid circuit of the detector to the frequency of any desired incoming signals. One side of the condenser 18 is connected to the filament of tube 16, and the other side of condenser 18 is connected to the grid of tube 16 through an adjustable condenser 20 of small capacity, and in parallel with the condenser 20 a high resistance 21, which resistance is also adjustable. For the resistance 21 I prefer in many cases to employ a resistance having small distributed capacity.

Connected in series with the plate of detector tube 16 is a winding 22 positioned in inductive relation to the grid circuit winding 13. Winding 22 is adjustable relative to winding 13 so as to alter the mutual inductance between the two windings.

The plate circuit of tube 16 is coupled to the grid circuit of the first audio-frequency amplifying tube 30, through a resistance coupling 31, consisting of resistances 32 and 33 in the plate circuit of tube 16 and grid circuit of tube 30 respectively, and a condenser 34 connecting similar terminals of the resistances 32 and 33, as shown. To form a path of low impedance around the resistance 32 for the high frequency components of the detector tube plate current, I connect around the resistance 32 a condenser 36 of low capacity.

The grid circuit of the second audio-frequency amplifying tube 40 is coupled to the plate circuit of tube 30 by a resistance coupling 41, comprising resistances 42 and 43 and condenser 44 connected as shown. Similarly, the grid circuit of the final amplifier tube 46 is coupled to the plate circuit of tube 40 by a resistance coupling 47, comprising resistances 48 and 49, and condenser 50. The highly amplified currents in the plate circuit of the final amplifier tube 46 serve to operate the loud speaker, or other signal translating device 52. Loud speaker 52 is preferably shunted by a condenser 53 of small capacity. If desired, the resistance 49 of coupling 47 may be shunted by a resistance 55, which is adjustable in value to control the volume of sound produced by the loud speaker. Heating current for the filaments of the various tubes is supplied from a battery 60, through conductors 61 and 62, connected respectively to the positive and negative terminals of the battery: the filaments being connected to conductors 61 and 62 in parallel circuit relation to one another. Included in the negative lead of each filament is an adjustable resistance 64 for controlling the current through the filament.

Connected between the conductors 61 and 62 in the manner shown is a potentiometer resistance 65, and adapted to form contact with any point along the length of resistance 65 is a conductor tap 66 connected to the grids of the amplifier tubes through conductors 68, 69 and 70 as shown, and through the coupling resistances in the respective grid circuits. It will be seen that adjustment of the tap 66 along resistance 65 serves to vary the biasing potential impressed on the grids of the amplifier tubes. In practice, I operate the system with the tap 66 near to, or at the negative end of, the potentiometer resistance 65. With the tap 66 at the negative end of resistance 65, the grid of each of the tubes will be negatively biased relative to the negative terminal of the tube filament by an amount proportional to the potential drop across that portion of the resistance 64 included in the filament heating circuit. When employing the commercially available tubes known as 201—A which are designed for operation at .25 amperes filament current at 5 volts, I preferably include several ohms resistance in the filament circuits, in this manner reducing the current consumed by the filaments, and providing the requisite negative grid biasing voltages for the amplifier tubes.

For the purpose of supplying direct current for energizing the tubes, I provide a rectifier 80, adapted to be energized from a source of alternating current indicated at 81, which source may be the usual alternating current house lighting mains, and connected with the output circuit of the rectifier is a filter 82. 83 represents the primary of an alternating current transformer, connected across the mains 81, which transformer is provided with low and high voltage secondary windings 86 and 87 respectively. The rectifier 80 comprises a vacuum tube, the plate and grid of which are connected with one terminal of the secondary winding 87, and the filament of which is connected across the secondary winding 86 through a current controlling rheostat 91. The other terminal of the secondary winding 87 is connected with the positive terminal of the battery 60 through a conductor 93 which forms the negative supply conductor for the plate circuits from the rectifier and filter. One of the filament leads to the tube 89 is connected as shown, through a reactance coil 94 of high impedance to the conductor 95, which forms the positive supply conductor for the plate circuits of the amplifier tubes. Connected across the filter output circuit at opposite sides of the reactance 94, are high capacity condensers 98 and 99, and also connected across the output circuit between the conductors 93 and 95, are an adjustable resistance 100 and in series with the resistance 100, a high capacity condenser 101. Joining this latter connection across the filter output, at a point between the resistance 100 and condensers 101, is a conductor 103, which forms the positive supply conductor for the plate circuit of the detector tube. The plate circuit of the final amplifier tube may be traced from positive conductor 95, loud speaker 52, plate of tube 46, returning to the negative side of the filter 82 through the filament of tube 46, filament supply circuit and conductor 93. Similarly, the plate circuits of amplifier tubes 30 and 40 may be traced through conducor 95, conductor 105 through the coupling resistances 42 and 48 to the plate of the respective tubes, and thence returning through the filaments and filament supply circuit. The plate circuit for the detector tube may be traced through conductor 103, coupling resistance 32, winding 22, plate of detector tube 16, and thence returning through the filament and filament supply circuit. Connected across the resistance 32, battery 60 and the source of current for the detector tube 16, is a condenser 110 of small capacity, which forms a low impedance path for high frequency components of the detector tube plate current.

The rectifier 80 operates in a manner well understood in the art to supply the filter 82, half-wave alternating current impulses, and the filter 82 serves to smooth out these impulses so that the voltage supplied to the plate circuit is substantially steady, being subject, however, to slight variations or ripples, which variations tend to produce hum in the loud speaker in the manner above described. The voltage applied to the plate circuit of the detector tube 16 is considerably less than the voltage applied to the plate circuits of the amplifier tubes, due to the voltage drop through resistance 100. Adjustment of resistance 100 serves to regulate the voltage applied to the detector tube plate circuit. I also find that adjustment of resistances 91 and 100 in connection with the adjustments of grid leak condenser 20 and resistance 21 is valuable in securing the desired elimination of hum and volume of sound in the loud speaker.

In the system shown, I employ a rectifier and filter which produces a plate circuit voltage at open circuit, of about 250 volts across conductors 93 and 95, and about 19 volts across conductors 93 and 103. When, however, current is flowing through the plate circuits, the voltage across conductors 93 and 103 is approximately 17 volts. The total current consumption in the plate circuits of the system shown, employing the type of tube known as 201—A for all of the tubes, is approximately 3 to 5 milliamperes, of which approximately 1 to 1.5 milliamperes is used in the plate circuit of final amplifier tube 46.

In one system constructed by me, the following are the values of the several resistances and capacities employed: resistance 70 32, 100,000 ohms; resistance 33, 1 megohm; resistance 42, 100,000 ohms; resistance 43, 500,000 ohms; resistance 48, 100,000 ohms; resistance 49, 250,000 ohms; variable resistance 100, 10,000 to 100,000 ohms; variable resistance 64, .25 to 100 ohms; resistance 21, .25 to 10 megohms; adjustable condenser 20, .0001 to .0004 mfds.; adjustable condenser 18, .0005 mfds. max.; condenser 110, .001 mfds.; condenser 36, .0005 mfds.; condensers 34, 44 and 50, .006 mfds. each; condenser 53, .002 mfds.; condenser 98, 2 mfds.; condenser 99, 4 mfds., and condenser 101, .25 mfds.

In considering the operation of my improved system in eliminating hum, it is to be noted that each of the plate circuits are supplied from the rectifier and filter with direct current voltage which is subject to variations due to imperfect filtration. The actual current variations in the plate circuit of any one tube other than the first tube, are the result of two separate effects; one, the effect of these voltage variations applied directly to the plate circuit of that tube, and the other, the effect which the varying voltage of the filter supplied to plate circuits of preceding tubes has in causing variations of similar frequency in the grid potential of that tube. Thus, a momentary rise in voltage applied by the filter to the plate circuit of the last tube would, if acting alone, cause an increase in current in the plate circuit. If simultaneously with the increase in voltage thus applied directly to the plate circuit there is also a change in the potential of the grid, the actual current in the plate circuit will depend upon the combined effect of the grid potential change and the change in voltage applied directly to the plate circuit. If with the rise in filter voltage the grid becomes more positive, each effect will tend to cause more current to flow through the plate circuit, the two effects being additive. Such a condition in the plate circuit of the last tube is obviously the least desirable, as it results in excessive current variations in the plate circuit.

On the other hand, if the potential variations of the grid were reversed in phase so that simultaneously with an increase in filter voltage applied directly to the plate circuit the grid becomes less positive, the net result is to reduce the current variations in the plate circuit. If the amplitude of variations of grid potential and filter voltage variations applied directly to the plate circuit are properly related in value, these two effects may be caused to cancel one another, with the result that no disturbing current variations are present in the plate circuit. It is the aim of the present invention to effect this result, or to so fix or control the relative values of these two effects, that current variations in the plate circuit of the last tube are maintained at such low amplitude as not to mask or materially interfere with the reception of signals.

Referring more particularly to the embodiment of my invention shown in the figure, the couplings here shown are resistance couplings comprising coupling condensers 34, 44 and 50. These couplings serve to transfer to the grid of the succeeding tubes potential variations which are proportional to the potential variations of that point of the preceding tube circuit which is connected to the coupling condenser. Thus, when the filter voltage applied to the detector tube circuit is rising, there is a rise of potential at the point 34' and a resulting increase in the potential of the grid of tube 30. This increase in potential of the grid of tube 30 causes a decrease in the internal impedance of the tube, tending to allow more current to flow through the plate circuit of this tube, and also tending to decrease the potential of the point 44' in the plate circuit which is connected to coupling condenser 44. Simultaneously with the increase in potential of the grid of tube 30, there is an increase in filter voltage applied to the plate circuit of this tube. While this increase of filter voltage also tends to cause an increase in plate current, it tends to raise the potential of the point 44'. The point 44' is thus subject to two effects; one, tending to raise its potential, and the other tending to lower its potential. If these two effects are equal and opposite, there will be no change of potential of the point 44' because of variations in the filter voltage, and therefore no variations from this source will be passed on to the grid of tube 40. If the effect of variations in the grid of tube 30 predominates over the effect of the filter voltage variations applied directly to the plate circuit of tube 30, the potential at the point 44' will decrease at the time the filter voltage is increasing. If, on the other hand, the filter voltage variations applied directly to the plate circuit of tube 30 predominates over the effect of the grid variations, the potential of point 44', and consequently the potential of the grid of tube 40, will increase as the voltage of the filter increases.

It will be seen that by control of the amplitude of the voltage variations delivered by the filter directly to the plate circuit of tube 30, or of the amplitude of variations in the grid potential of tube 30, the effects of these two variations may cancel one another, or one or the other of these effects may be made to predominate to a greater or less degree with the result that the grid of tube 40 will be subject to no variations, or to variations of greater or less magnitude, and in either of two opposite phases.

The potential variations at the point 50' in the plate circuit of tube 40 are likewise dependent on variations of potential of the grid of tube 40 and variations of filter voltage applied directly to the plate circuit of this tube, the effects of these variations combining to cause variations at the point 50', which are carried over to the grid of the last amplifier tube.

Neglecting certain phase shifts which occur at points in the system, such, for example, as a small phase shift introduced by condenser 34, approximate values of the potential variations at points 34', 44' and 50' may be expressed quantitatively. While I disclose my invention as applied to a resistance coupled amplifier which has certain marked advantages over amplifiers of other types, it will be clear from the above explanation that the mode of operation described is applicable to inductance coupled amplifiers, condenser coupled amplifiers and direct coupled amplifiers. I employ the term impedance coupling to designate generally the coupling having the characteristics of any of these types.

Thus, for the point 34'

$$DV_1 = \frac{R_d}{R_d + R_1} e \quad (1)$$

where $e$ represents the voltage variations applied by the filter to the detector tube plate circuit and $R_d$ the internal resistance of the detector tube.

The potential variations at the point 44' are $$DV_2 = DV_{2b} + DV_{2a} \quad (2)$$

where $DV_{2b}$ is the change in $V_2$ due to the change in potential of the grid or tube 30, and $DV_{2a}$ is the change in $V_2$ due to variations of filter voltage applied directly to the plate circuit of tube 30.

Calling these variations $e'$ $$DV_{2a} = e' \frac{R_p}{R_2 + R_p} \quad (3)$$

where $R_p$ is the internal resistance of tube 30, and $R_2$ is the resistance in the plate circuit of tube 30. Also $$DV_{2b} = -Mu_1 DV_1' \frac{R^2}{R_2 + R_p} \quad (4)$$

where $Mu_1$ is the amplifying factor of tube 30, and $DV'$ is the change in the grid potential of tube 30.

Therefore, from equations 2, 3 and 4, $$DV_2 = -Mu_1 DV_1' \frac{R^2}{R^2 + R_p} + e' \frac{R_p}{R^2 + R_p} \quad (5)$$

The change in potential of the grid of tube 30, $DV_1'$, is somewhat less than the change in potential of the point 34', DV of equation 1, due to loss of voltage through condenser 34. This loss may be readily calculated. Thus taking values above given of capacity and grid resistance at coupling 31, assuming a 60 cycle alternating current supplied to the rectifier and taking double the fundamental of the potential variations of the filter, namely 120, the change in potential of grid tube 30 is approximately .97 of the change in potential of the point 34'.

Similarly, the change in potential of the point 50' is $$DV_3 = -Mu_2 DV_2' \frac{R_3}{R_3+R_{pa}} + DV_{3a} \quad (6)$$

where $Mu_2$ is the amplifying factor of tube 40, $DV_2'$ is the change in potential of the grid of tube 40, $R_3$ is the resistance plate circuit of tube 40, $R_{pa}$ is the internal resistance of tube 40, and $DV_{3a}$ is the change in $DV_3$ due to the variations in filter voltage applied directly to the plate circuit of tube 40.

The condition of no current variations in the plate circuit of the last tube is $$Mu_3 DV_3' + e = 0 \quad (7)$$

It will be apparent by properly relating the electrical quantities in the system, as expressed in the above equations, such as the coupling and tube resistances, that variations may be introduced into the grid of the last tube, the effect of which when combined with the effect of variations of filter potential applied directly to the plate circuit of this tube, will so reduce the current variations in the plate circuit that no audible hum will be produced in the telephone or loud speaker. The particular system above described and illustrated in the figure, represents one embodiment of my invention wherein this result is attained, and wherein, at the same time, signals may be received by the system and amplified efficiently.

Furthermore, the system above described employs a number of means whereby potential variations applied to the grid of the last tube may be changed as desired, so as to control the hum. Thus, adjustment of the resistance 100 in the filter controls the voltage applied to the detector tube plate circuit, and in connection with condenser 101, controls the variation of filter voltage applied to the detector tube in relation to the variation of filter voltage applied to other tubes.

Another means for controlling hum in the above described embodiment of my invention is the adjustment of the grid leak resistance 21. One important result of adjusting this resistance is to change the grid bias of the detector tube and so change the internal resistance or impedance of the tube. By reference to Equation 1, it will be seen that increasing the internal resistance of the detector tube increases the variations of the potential at the point 34', and decreasing this resistance decreases these variations.

Similarly the grid bias of each of the tubes may be changed by adjustment of the rheostat 64 in the filament heating circuits.

Inasmuch as variations in the earlier stages are amplified in succeeding stages, the same adjustments of the circuits in an earlier stage produces much greater effect in the output circuit of the last tube than corresponding adjustments in the later stages, this being true in spite of the fact that the last stage consumes much more power in the plate circuit than the preceding stages. The arrangement in the filter circuit of the resistance 100 in series with the detector plate circuit and the condenser 101 across the detector plate circuit is of decided advantage. The condenser, which does not permit the passage of the direct component of the filter current, forms a by-pass for the varying component, thus acting to reduce the variations applied to the detector tube circuit, and at the same time avoids excessive consumption of current from the filter.

It may be seen from an inspection of the foregoing equations that hum may be controlled by adjustments other than those above mentioned, such adjustments being either in a local tube circuit or in circuits common to a plurality of tubes. Thus it will be seen from Equation 1 that increasing the resistance R', that is, the coupling resistance in the plate circuit of the detector tube, decreases the voltage variations at point 34'. Such an adjustment might be provided in certain cases by making the coupling resistance adjustable, or by including an adjustable resistance in the lead 103. Also, in certain cases an adjustable resistance might be placed in the plate circuit between the point 34' and the plate, it being noted, however, that a resistance in this part of the plate circuit has an effect on the amplitude of variations at the point 34', which is opposite to the effect of a resistance between this point and the positive terminal of the plate current supply.

Variations in potential at the point 34' may also be changed by changing the voltage variations supplied to the detector plate circuit. In the system shown in the figure, such a change is accompanied by adjustment of the resistance 100. In certain cases it may be advisable to effect this change by means of an adjustable capacity in place of the condenser 101.

An inspection of Equation 5 shows the effect of the same adjustments in the resistance and voltage variations applied to the plate circuit at the first amplifier tube.

I also find that hum may be controlled by a resistance in the grid circuit of tube 40 located between the condenser 44 and the grid. I find that an adjustable resistance at this point is particularly effective where instead of a resistance coupled amplifier I use the so-called impedance coupled amplifier.

It is obvious that in any given system, one or more of these adjustments may be much more suitable than other adjustments.

Adjustments such as those above described adapt the amplifier for use with rectifiers and filters of widely different construction.

Inasmuch as hum is eliminated by causing the effect of variations in filter voltage applied to one part of the system to oppose and reduce or cancel the effect of filter variations applied to another part of the system, the amplitude of the filter voltage variations may be changed without affecting the hum, thus making it possible to employ relatively cheap filters wherein the output voltage is subject to large periodic variations. In the system above described I employ condensers in the filter circuit having an aggregate capacity of 6.25 microfarads. I find that I am able to reduce this capacity by more than two microfarads without affecting the hum and without affecting the reception, detection and amplification of the received signals.

The particular construction of the radio frequency transformer comprising the windings 12 and 13 and the tickler coil 22 is described in my co-pending application, Serial No. 196,244, filed June 3, 1927, and in said co-pending application, I disclose the use of windings 12 and 13 with the winding 22 omitted in case I desire to employ one or more stages of radio frequency amplification preceding the detector state of the system herein described.

This application is a continuation in part of my said application, Serial No. 196,244, and reference is had to such application for details of construction and arrangement of parts as may be utilized in the embodiment of the present system.

I claim:

1. A multi-stage resistance coupled vacuum tube signal repeating system having the electrical quantities of its various parts so proportioned that its plate circuits may be supplied by a source of current of varying voltage and the variations in the plate circuit of a later tube maintained at less than a disturbing value through the opposing effects of variations in grid potential and variations of said voltage applied directly to the plate circuits.

2. A multi-stage resistance coupled vacuum tube signal repeating system having the electrical quantities of its various parts so proportioned that its circuits may be supplied by a source of current of varying voltage and the current variations in the plate circuit of the last tube maintained at less than a disturbing value through the opposing effects of variations in grid potential and variations of said voltage applied directly to the tube circuits.

3. A multi-stage vacuum tube amplifier system designed to operate a loud speaker, a source of current of varying voltage for energizing tube circuits of said system and tending to produce disturbing variations in the loud speaker circuit, said system including two circuits arranged in tandem and connected to one another by a resistance coupling adapted to deliver to the circuit following the coupling signal variations which are proportionate to changes of potential across a tube preceding said coupling and means for maintaining disturbing potential variations derived from said source and transmitted through said coupling at a desired value by opposing the effect of variations applied from said source directly to the circuit of said preceding tube by the effect of variations of grid potential of said tube derived indirectly from said source, whereby said variations in said loud speaker circuit are maintained at less than disturbing value.

4. In a multi-stage vacuum tube signal repeating system, a resistance coupling between two stages so constructed and arranged that potential variations are impressed through a condenser on the grid of one tube in accordance with potential variations of a point in the plate circuit of the preceding tube and wherein the electrical quantities of the various parts of the system are so proportioned that tube circuits may be supplied from a source of varying voltage and disturbing variations in the output circuit of said system substantially eliminated through opposing effects of voltage variations applied directly to plate circuits in one part of the system and variations in grid potential resulting from said voltage variations applied to plate circuits in another part of the system, the said coupling including a high resistance in the grid circuit of the following tube and said coupling condenser having a capacity greater than .005 microfarads whereby the phase shift of variations passed through said coupling is relatively small.

5. In a multi-stage vacuum tube radio receiving and amplifying system having a translating device connected to its output circuit, a source of varying current for energizing plate circuit electrodes of said system and tending to cause disturbing hum variations in the translating device, means for reducing said disturbing variations comprising two tubes followed by a resistance coupling for supplying to a succeeding part of the system variations corresponding to variations of potential of a point in the plate circuit of a tube preceding said coupling, connections between said source and said two tubes for supplying thereto current having variations of similar phase, means for causing the variations supplied to the earlier of said tubes, by affecting the grid of later tube to oppose at said point the variations supplied to the later of said tubes and means for causing the values of said opposing effects to bear a predetermined relation, one to the other.

6. In a multi-stage vacuum tube radio receiving and amplifying system having a translating device connected to its output circuit, a source of varying current for energizing the plate circuits of said system and tending to cause disturbing hum variations in the translating device, means for reducing said disturbing variations comprsing two tubes followed by an impedance coupling for supplying to a succeeding part of the system variations corresponding to variations of potential of a point in the plate circuit of a tube preceding said coupling, connections between said source and the plates of said two tubes for supplying thereto current having variations of similar phase, means for causing the variations supplied to the earlier of said tubes, by affecting the grid of the later tube to oppose at said point the variations supplied to the later of said tubes and means for causing the values of said opposing effects to bear a predetermined relation, one to the other.

7. In a multi-stage vacuum tube radio receiving and amplifying system having a loud speaker connected with its output circuit, a source of varying current for energizing the system and tending to cause disturbing variations in the loud speaker circuit, means for reducing said disturbing variations comprising an impedance coupling connected in a tube circuit and adapted to deliver to the following portion of the system potential variations corresponding to potential variations of point in the output circuit of said tube, connections from said source to said tube for energizing a tube electrode and tending to cause variations of potential of said point, connections from said source, through a preceding portion of said system, to the grid of said tube, and tending to cause opposing variations at said point and means for causing the values of the opposing effects at said point to bear a predetermined relation to one another.

8. In a multi-stage vacuum tube signal receiving and amplifying system having a loud speaker connected with its output circuit, a source of varying current for energizing the system and tending to cause disturbing variations in the loud speaker circuit, means for reducing said disturbing variations comprising an impedance coupling connected in a tube circuit and adapted to deliver to the following portion of the system potential variations corresponding to potential variations of point in the output circuit of said tube, connections from said source to said tube for energizing a tube electrode and tending to cause variations of potential of said point, connections from said source to the grid of said tube and tending to cause opposing variations at said point and means for causing the value of said opposing effects to bear a predetermined relation, one to another.

9. In a multi-stage vacuum tube radio receiving and amplifying system, having a loud speaker connected with its output circuit, a source of varying current for energizing the plate circuits of the system and tending to cause disturbing variations in the loud speaker circuit, means for reducing said disturbing variations comprising a resistance coupling connected in a tube circuit and adapted to deliver to the following portion of the system potential variations corresponding to potential variations of point in the output circuit of said tube, connections from said source to said tube for energizing a tube electrode and tending to cause variations of potential of said point, connections from said source, through a preceding portion of said system, to the grid of said tube, and tending to cause opposing variations at said point and means for causing the value of said opposing effects to bear a predetermined relation, one to another.

10. In a multi-stage vacuum tube amplifier, means for supplying the plate circuits by direct current subject to fluctuations which produce variations in the plate circuit, impedance couplings between stages which deliver fluctuations of the same phase as fluctuations in the source of supply, means for relating the fluctuations in the respective circuits so as effectively to eliminate such fluctuations in the output of the system, said last named means including means for reducing the fluctuations supplied to an earlier stage to a small fraction of the fluctuations supplied to a later stage.

11. A multi-stage vacuum tube amplifier having resistance couplings which serve to reverse the phase of preceding grid potential variations, means for energizing the plate circuits by direct current subject to fluctuations which produce variations in the plate circuits, means for relating the fluctuations in the respective circuits so as effectively to eliminate such fluctuations in the output of the system, said last named means including a filter in the supply circuit of an earlier stage for reducing the variations to a small fraction of those supplied to subsequent stages.

12. A multi-stage signal receiving and repeating system having, in successive stages, vacuum tubes and couplings between the plate circuit and grid circuit, respectively, of preceding and succeeding tubes, a source of alternating current, a rectifier connection to said source, a filter connected to said rectifier and adapted to supply to tube plate circuit direct current voltages having substantial unsteady components, said voltages being of such value to permit said tubes to operate effectively as signal repeaters, at least one of said couplings being an impedance coupling which delivers variations substantially in phase with variations in filter voltage, and the parts being so constructed and arranged that the net effect of voltage applied to the plate circuit of the last tube and voltage applied to the plate circuits of preceding tubes is to maintain variations in the plate circuit of a last tube below disturbing source.

13. A multi-stage signal and repeating system having in three successive stages vacuum tubes and couplings between the plate and grid circuits, respectively, of preceding and succeeding tubes, a source of alternating current, a half wave rectifier connected to said source, a filter connected to said rectifier and adapted to supply to tube plate circuits direct current voltages having substantial unsteady components, said voltages being of such values as to permit said tubes to operate effectively as signal repeaters, and at least one of said couplings being a resistance coupling, and the parts being so constructed and arranged that the net effect of the voltage applied to the plate circuit of the preceding tube is to maintain variations in the plate circuit in the last tube below disturbing values.

14. A multi-stage amplifying system having vacuum tubes in three successive stages, audio frequency couplings between said stages, the coupling between two later stages being a resistance coupling, whereby increase in impedance of the tube in the earlier of said two stages causes a decrease in impedance of the tube in the later of said two stages, a source of direct current having a substantially unsteady current for supplying voltages to the plate circuits of different tubes and means for controlling one of said voltages whereby said voltages may be so proportioned that disturbing current variations in the plate circuit of a later tube are substantially nullified.

15. The method of operating a vacuum tube amplifier energized from a source of fluctuating current which tends to cause disturbing variations in the output circuit, said amplifier having resistance coupling connected in the plate circuit of a vacuum tube and adapted to receive and deliver signal impulses, which method consists in supplying from said source to the plate of said tube an energizing voltage subject to fluctuations, supplying from said source to the grid of said tube voltage fluctuations of the same frequency and substantially of the same phase and bearing a predetermined relation in amplitude to said last named fluctuations, said fluctuations applied to said grid serving to oppose in their effect and substantially neutralize the fluctuations applied to the plate.

16. The method of operating a vacuum tube amplifier energized from a source of fluctuating current which tends to cause disturbing variations in the output circuit, said amplifier having resistance coupling connected in the plate circuit of a vacuum tube and adapted to receive and deliver signal impulses, which method consists in supplying from said source to the plate of said tube an energizing voltage subject to fluctuations, supplying from said source to a plate circuit electrode of a preceding tube and thence through an interstage coupling to the grid of said first named tube voltage fluctuations of the same frequency and substantially of the same phase and bearing a predetermined relation in amplitude to said last named fluctuations, said fluctuations applied to said grid serving to oppose in their effect the fluctuations applied to the plate whereby the fluctuations delivered by said coupling are of an amplitude corresponding to the difference in the effect of said grid and plate fluctuations and neutralizing the effect of said fluctuations delivered by said couplings.

17. The method of operating a vacuum tube amplifier energized from a source of fluctuating current which tends to cause disturbing variations in the output circuit, said amplifier having resistance coupling connected in the plate circuit of a vacuum tube and adapted to receive and deliver signal impulses, which method consists in supplying from said source to the plate of said tube an energizing voltage subject to fluctuations, supplying from said source to the grid of said tube voltage fluctuations of the same frequency and substantially of the same phase and bearing a predetermined relation in amplitude to said last named fluctuations, said fluctuations applied to said grid serving to oppose in their effect the fluctuations applied to the plate whereby the fluctuations delivered by said coupling are of an amplitude corresponding to the difference in the effect of said grid and plate fluctuations, and neutralizing the effects of said last named fluctuations by other fluctuations supplied from said source to another part of the system.

18. An audio frequency vacuum tube amplifier having a series of stages coupled by resistance couplings, a source of current for a plate circuit of the tubes, an impedance common to the plate circuits of two tubes and forming a coupling plate between the tubes, and means for supplying from said source to the plates of successive tubes progressively increasing voltages, the value of the voltage applied to one tube being of sufficient magnitude with respect to the voltage applied to the preceding tube to prevent disturbing regenerative effects due to the common impedance coupling.

19. An audio frequency vacuum tube repeating system having a series of stages with a resistance coupling between two of the stages, a rectifier and filter for supplying the plate circuits of the tubes, said filter including an impedance forming a coupling between the plate circuits of said two tubes, and means for supplying voltages from said filter to the plates of said tubes, the effective voltage supplied to the second of said two tubes being greatly in excess of the effective voltage supplied to the plates of the first of said tubes whereby disturbing regenerative effects are avoided.

20. An audio frequency vacuum tube repeating system having a series of stages with a resistance coupling between two of the stages, a rectifier and filter for supplying the plate circuits of the tubes, said filter including an impedance forming a coupling between the plate circuits of said two tubes, and means for supplying voltages from said filter to the plates of said tubes, the effective voltage supplied to the second of said two tubes being greatly in excess of the effective voltage supplied to the plates of the first of said tubes whereby disturbing regenerative effects are avoided, said last named means including a condenser for reducing fluctuations applied to the plate circuit of said first tube to a value substantially less than the fluctuations supplied to the plate of the second tube.

21. A vacuum tube audio frequency amplifier comprising a series of vacuum tubes connected in tandem, a source of current for said tubes subject to periodic fluctuations of voltage, a translating device supplied by the last tube and arranged to be operated in accordance with potential variations between the source and said last tube, means for supplying to the grid of said last tube potential variations of a phase to oppose variations supplied from said source to the plate circuit of the last tube, said means including a preceding tube and a resistance coupling in the output circuit of said preceding tube designed to deliver to the grid of the succeeding tube potential variations across said preceding tube, means for supplying to said preceding tube variations which oppose one another in causing changes of potential across said preceding tube and means for proportioning said last named variations to one another whereby the variations delivered by said coupling when combined with variations from said source supplied to the last tube to substantially eliminate disturbing variations in the translating device.

22. A vacuum tube signal receiving system, comprising a vacuum tube and an impedance coupling on the plate circuit of said tube and adapted to deliver signal impulses, means for energizing the plate circuit of the tube by current subject to voltage fluctuation, means for supplying from said source to the grid of said tube, fluctuation in phase with the fluctuation supplied to said plate, and filtering means for reducing the fluctuations supplied to the grid of the tube to an extent sufficient to cause said fluctuations when amplified to oppose and substantially annul said fluctuations supplied to parts of the system succeeding said grid.

23. A multi-stage resistance coupled vacuum tube amplifier comprising means for energizing the plate circuits of the tubes by direct current subject to fluctuations, said means comprising a rectifier and a filter consisting of series inductance and shunt capacitance of less than seven microfarads, and substantially infinite shunt resistance, a connection across said filter comprising an impedance and capacity in series, and connections from a point between said capacity and impedance for supplying current to the plate of an earlier tube, said capacity serving to reduce fluctuations supplied to the plate of said earlier tube to a value which when fed forward and amplified serve to annul fluctuations supplied to a later part of the system.

24. In a multi-stage vacuum tube signal receiving system, a source of fluctuating current for supplying the tube plate circuits and tending to produce disturbing current variations in the output of the system, said system comprising a detector tube and an audio frequency amplifier tube coupled by a resistance coupling whereby momentary increases in voltage from said source cause increases in potential of the grid of said amplifier tube, means for opposing the variations fed forward through said coupling by variations from said source supplied to a subsequent part of the system and means for reducing the variations supplied to the plate of the detector tube in accordance with amplification whereby disturbing variations in the output of the system are substantially nullified.

25. A multi-stage resistance coupled vacuum tube amplifier adapted to give successive reversals of phase of signal current from stage to stage, means for supplying plate circuit electrodes with fluctuating current tending to produce disturbing variations in the output of the system, means for reducing the fluctuations supplied to an earlier stage in accordance with the amplification so that the fluctuations fed on from stage to stage substantially neutralize one another and no disturbing fluctuations occur in the output circuit.

26. In a multi-stage vacuum tube radio receiving and amplifying system having a translating device connected to its output circuit, a source of varying current for energizing said system and tending to cause disturbing hum variations in the translating device, means for reducing said disturbing variations comprising two tubes followed by an impedance coupling for supplying to a succeeding part of the system variations corresponding to variations of potential of a point in the plate circuit of a tube preceding said coupling, connections between said source and plate circuit electrodes of said two tubes for supplying thereto current having variations of similar phase, means for causing the variations supplied to the earlier of said tubes, by affecting the grid of later tube to oppose at said point the variations supplied to the later of said tubes and means for causing the values of said opposing effects to bear a predetermined relation, one to the other.

27. In a multi-stage vacuum tube radio receiving and amplifying system, a source of varying current for energizing the system and tending to cause disturbing variations in the output circuit, means for reducing said disturbing variations comprising an impedance coupling connected in a tube circuit and adapted to deliver to the following portion of the system potential variations of a point in the output circuit of said tube, connections from said source to said tube for energizing a tube electrode and tending to cause variations of potential of said point, connections from said source to a tube grid and tending to cause opposing variation at said point and means for causing the amplitude of said opposing variations to bear a predetermined relation, one to the other, and means for varying the volume of signal impulses in output circuit while maintaining said predetermined relationship.

28. A multi-stage vacuum tube repeater comprising detector and amplifying stages having impedance couplings which serve to reverse the phase of preceding grid potential variations, means for energizing tube circuits by current subject to fluctuations which are supplied to electrodes of the tubes in successive stages, the first of which is the plate of the detector tube and means for relating the fluctuations in the respective circuits so as effectively to eliminate such fluctuations from the output of the system.

29. A multi-stage vacuum tube repeater comprising detector and amplifying stages having impedance couplings which serve to reverse the phase of preceding grid potential variations, means for energizing tube circuits by current subject to fluctuations which are supplied to electrodes of the tubes in successive stages, the first of which is the plate of the detector tube and means for relating the fluctuations in the respective circuits so as effectively to eliminate such fluctuations from the output of the system, said last named means including a filter in the supply circuit of the detector stage for reducing the variations to a small fraction of those supplied to subsequent stages.

30. A multi-stage vacuum tube signal repeating system having impedance couplings which serve to reverse the phase of preceding grid potential variations, means for energizing tube circuits from a source of current subject to fluctuations which are supplied to tube electrodes of successive stages, the first of which is a tube plate, and means for relating the fluctuations in the respective circuits so as effectively to eliminate such fluctuations in the output of the system.

31. A vacuum tube signal receiving and amplifying system having radio and audio frequency amplifying stages and a detector stage, with interstage impedance couplings which serve to reverse the phase of preceding grid potential variations, means for energizing plate circuits by current subject to fluctuations which tend to produce disturbing variations in the output circuit, means for relating the fluctuations in the respective circuits so as effectively to eliminate disturbing variations in the output of the circuit, said means comprising a filter in the output of the detector tube for reducing the fluctuations supplied to the plate circuit of the detector tube to a small fraction of those supplied to the plates of later tubes.

32. In the operation of a multi-stage vacuum tube repeater from a source of fluctuating current which tends to cause disturbing variations in the output circuit, said amplifier having an interstage impedance coupling adapted to receive and deliver signal impulses, the method of supplying from said source to corresponding electrodes of the several tubes fluctuations of substantially the same frequency and phase and of such values and so proportioned in amplitude, with respect to one another, that fluctuations supplied to the earlier part of the system when carried forward oppose the fluctuations supplied to the later part of the system, and serve effectively to eliminate disturbing variations in the output circuit.

Signed at New York in the county of New York and State of New York this 14th day of August A. D. 1928.

HAROLD R. HAYDEN.